(12) United States Patent
Kimbrough

(10) Patent No.: US 6,370,467 B1
(45) Date of Patent: Apr. 9, 2002

(54) METHOD OF CALCULATING OPTIMAL WHEELSLIPS FOR BRAKE CONTROLLER

(75) Inventor: Scott Stephen Kimbrough, Salt Lake City, UT (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/132,194

(22) Filed: Aug. 10, 1998

(51) Int. Cl.[7] .............................. B62D 5/00; B60T 8/32; B60L 7/10
(52) U.S. Cl. ............................ 701/71; 701/75; 701/84; 303/186; 188/181 C
(58) Field of Search ............................. 701/70, 71, 72, 701/79, 82, 83, 90, 74, 75, 78, 84, 91; 180/197; 188/181 C, 181 R; 303/186, 170, 174, 184, 149, 168, 150, 162, 146, 175, 140, 189, 185, DIG. 6

(56) References Cited

U.S. PATENT DOCUMENTS

| | | | |
|---|---|---|---|
| 3,614,173 A | 10/1971 | Branson | 303/21 P |
| 3,764,182 A | 10/1973 | Andreyko et al. | 303/21 EB |
| 4,308,583 A | 12/1981 | Musolino et al. | 364/426 |
| 4,653,816 A | 3/1987 | Lin | 303/106 |
| 4,669,045 A | 5/1987 | Kubo | 364/426 |
| 4,674,049 A | 6/1987 | Kubo | 364/426 |
| 4,674,050 A | 6/1987 | Kubo | 364/426 |
| 4,834,205 A * | 5/1989 | Mizuno et al. | 180/141 |
| 4,855,916 A | 8/1989 | Bernard | 62/244 |
| 4,862,368 A | 8/1989 | Kost et al. | 364/426.02 |
| 4,876,650 A | 10/1989 | Kubo | 364/426.02 |
| 4,916,619 A | 4/1990 | Walenty et al. | 364/426.02 |
| 4,999,778 A | 3/1991 | Ruhl et al. | 701/74 |
| RE33,663 E | 8/1991 | Kade et al. | 364/426.02 |
| 5,140,524 A | 8/1992 | Matsuda | 364/426.02 |
| 5,172,319 A | 12/1992 | Shiraishi et al. | 364/426.03 |
| 5,251,137 A | 10/1993 | Chin et al. | 364/426.02 |
| 5,302,009 A | 4/1994 | Menard | 303/100 |
| 5,388,658 A | 2/1995 | Ando et al. | 180/197 |
| 5,576,959 A * | 11/1996 | Hrovat et al. | 364/426.03 |
| 5,610,819 A | 3/1997 | Mann et al. | 364/426.05 |
| 5,671,143 A | 9/1997 | Graber | 364/426.016 |
| 5,671,982 A | 9/1997 | Wanke | 303/146 |
| 5,694,321 A | 12/1997 | Eckert et al. | 364/426.037 |
| 5,947,221 A * | 9/1999 | Taniguchi et al. | 180/197 |
| 5,951,118 A * | 9/1999 | Soejima | 303/113.1 |
| 6,052,641 A * | 4/2000 | Wuerth et al. | 701/70 |
| 6,070,953 A * | 6/2000 | Miyago | 303/152 |

OTHER PUBLICATIONS

"Stability Enhancement And Traction Control Of Road Vehicles," by Scott Kimbrough, Int.J. Systems Sci., 1990, vol. 21, No. 6, pp. 1105–1119. (Month is not available).
"Sudden Heading Error As A Feedback Variable For Stability Enhancement Systems," by Scott Kimbrough, et al., DSC–Vol. 44, Transportation Systems—1992, ASME 1992, pp. 397–411.
"A Computer Investigation Of The Performance Potential Of An Advanced Brake Controller", by Scott Kimbrough, SAE Technical Paper No. 940836, Feb. 28–Mar. 3, 1994, pp. 97–109. (Month is not available).

* cited by examiner

*Primary Examiner*—Tan Nguyen
*Assistant Examiner*—Dalena Tran
(74) *Attorney, Agent, or Firm*—Gregory P. Brown

(57) ABSTRACT

Wheelslip is controlled in an automotive vehicle having at least one wheel for which control is desired. Each wheel is controlled by a corresponding element of a command wheelslip vector. A first wheelslip vector is determined, one element of the first wheelslip vector for each wheel, the first wheelslip vector being operative to optimally minimize the time rate of change of weighted kinetic energy. A second wheelslip vector is determined, one element of the second wheelslip vector for each wheel, the second wheelslip vector being operative to maximize the time rate of change of weighted kinetic energy. The elements of the wheelslip vectors are determined in view of a stability effect determined for each of the at least one wheel.

15 Claims, 8 Drawing Sheets

METHOD OF CALCULATING OPTIMAL WHEELSLIPS FOR BRAKE CONTROLLER

TECHNICAL FIELD

The present invention relates to the control of brakes and traction control systems for motor vehicles. More specifically, the present invention provides a method of determining optimal wheelslips for use in brake and traction control systems.

BACKGROUND ART

Wheelslip is a derived quantity that indicates the amount of slippage between a wheel and the ground. Wheelslip is important because, by controlling the wheelslip, the force produced by the tires can be directly modified since tire forces are a function of wheelslip.

Controlling wheelslip involves controlling the actual slippage of the wheels and it has the potential to yield precise forms of anti-lock braking, stability and handling enhancement, and traction control. In spite of these potential benefits, practical use of wheelslip control has not become common. There have been three major impediments to the application of wheelslip control. First, wheelslip control requires monitoring the wheelslip level, but calculating wheelslip requires knowing the speed of the vehicle relative to the ground. Second, in its fullest form, wheelslip control requires a brake-by-wire brake system with many actuators and transducers. Third, in its fullest form, wheelslip control depends on knowing the tire/road interface conditions, which change frequently.

Recent advances have produced improved means for solving these three major problems. As a consequence, the commercial application of wheelslip controller brake systems has become more feasible.

For some time, there has existed a mathematical theory for determining the most appropriate wheelslip levels to maintain at the wheels of a ground vehicle during emergency (maximum effort) stops. This theory shows how to find an optimal set of wheelslips that provide the maximum amount of deceleration possible while maintaining the vehicle directional stability within specified bounds. However, the theory does not immediately extend to situations where the driver may be requesting little or no braking or may be accelerating.

There are three possible situations that can arise. In the first situation, the driver is demanding more deceleration than can be provide while maintaining stability. A typical example would be when the driver is braking hard and attempting to turn at the same time. If the brakes are applied at full force, the vehicle might become difficult to control, be difficult to steer, or both. Therefore, it may be desirable to partially release some of the brakes. In the second situation, the driver is demanding a moderate level of deceleration and is only partially applying the brakes. Under such situations, there will be many ways the brakes can provide the demanded deceleration, and some of these ways can also help the vehicle handle better and maintain stability. In the third situation, the driver is demanding less deceleration than is required to maintain stability. A typical example would be where the driver is not applying the brakes at all, and is trying to make a severe maneuver. If the vehicle starts to slide, spin out, or experience excessive understeer, it will be desirable for some brakes to come on to prevent a severe loss of control.

Therefore, it would be desirable to provide a method of deriving individual wheelslip commands vectors covering the full range of possible conditions a vehicle might encounter. The derived wheelslips should be chosen to satisfy the driver's demand for acceleration, as much as possible, while at the same time maintaining the directional stability of the vehicle within specified bounds. Additionally, the wheelslip commands vectors should be generated in a computationally efficient manner.

SUMMARY OF THE INVENTION

The present invention provides a method for determining a first wheelslip vector used to control braking in an automotive vehicle having at least one wheel for which braking control is desired. The method comprises the steps of:

(a) determining a stability effect for each of the at least one wheel; and (b) for each of the at least one wheel with a stability enhancing stability effect, determining as the corresponding value of the first wheelslip vector a wheelslip threshold such that said first wheelslip vector provides optimal acceleration.

It is an advantage of the present invention to provide a computationally efficient method of calculating optimal wheelslips to be used to generate individual wheelslip commands in a brake controller.

DETAILED DESCRIPTION OF THE PREFERRED EMBODIMENTS

Figure 1:
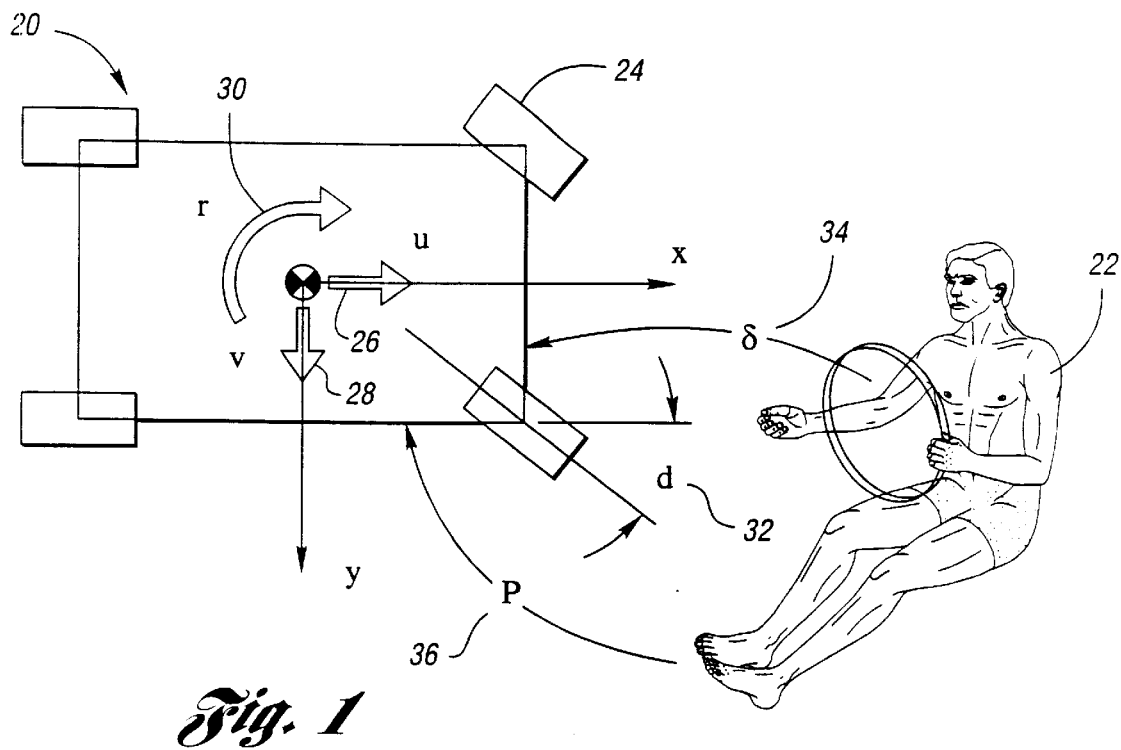
FIG. 1 is a schematic diagram defining the vehicle coordinate system and velocity variables.

Referring now to FIG. 1, a schematic diagram defining the vehicle coordinate system and velocity variables is shown. Vehicle 20 is operated by driver 22. Driver 22 inputs steering and pedal commands to the vehicle. Vehicle 20 is shown with four wheels, one of which is indicated by 24, the front two of which are steerably coupled. However, the present invention applies to vehicle 20 with any number of wheels 24 and with any combination of coupled or independently steerable wheels 24. The term wheel is used in a general sense and includes all manner of solid tires, inflatable tires, tireless wheels, and the like.

Attached to vehicle 20 is a coordinate system. The x axis is aligned with the longitudinal axis of vehicle 20 and the y axis is aligned with the lateral axis. The origin of the coordinate system is placed at the center-of-mass of vehicle 20.

Vehicle 20 is assumed to be on relatively level ground and its velocity is assumed to consist of a longitudinal velocity u, shown as 26, a lateral or sideslip velocity v, shown as 28, and a yaw rate r, shown as 30. The yaw rate is the rotational velocity in the road plane.

It is convenient to separate variables describing the vehicle velocity into two groups. The first group is longitudinal velocity 26 and the second group contains sideslip velocity 28 and the yaw rate 30. Sideslip velocity 28 and yaw rate 30 are known as stability variables. It will be obvious to one practiced in control system design that a different set of variables could be chosen to represent vehicle 20 motion within the scope and spirit of the present invention.

A vector d, shown as 32, will be used to represent the set of wheel steering angles for vehicle 20 that result from driver steering input δ, shown as 34. The variable P, shown as 36, will be used to represent the pedal commands from driver 22. Pedal commands 36 may be in the form of pressures, forces, positions, or the like.

Figure 2:
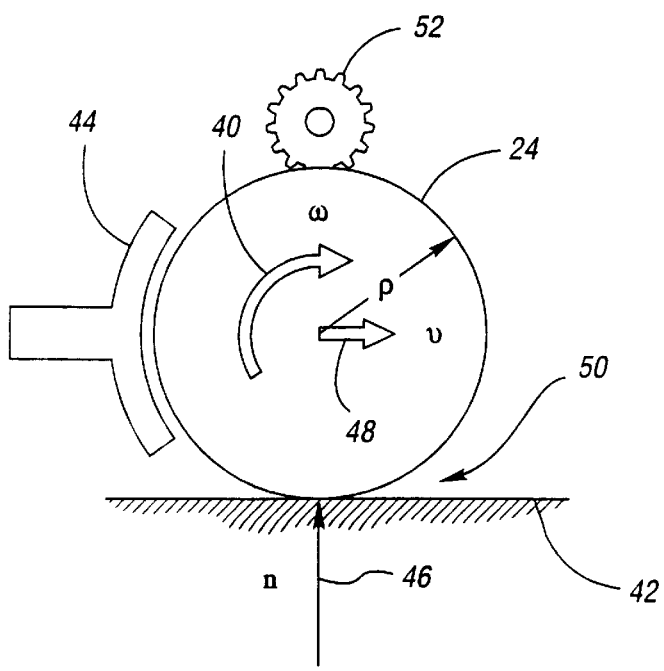
FIG. 2 is a schematic diagram of a side view of a wheel and brake combination for defining wheelslip.

Referring now to FIG. 2, a schematic diagram of a side view of a wheel and brake combination is shown. Wheel 24 is spinning with rotational rate ω, shown as 40, on road surface 42. Brake 44 can be applied to reduce rotational rate 40. Wheel 24 has normal force n, shown as 46, with road surface 42. The action of wheel 24 on road surface 42 causes wheel 24 to have wheel longitudinal velocity υ, shown generally as 48, as measured in the plane of the wheel and parallel to the ground. When the product of wheel rotational rate 40 and wheel radius ρ does not equal wheel longitudinal velocity 48, wheelslip λ, shown generally as 50, occurs between wheel 24 and road surface 42. Wheelslip is defined mathematically in Equation 1:

$$\lambda = \frac{\upsilon/\rho - \omega}{\upsilon/\rho} = 1 - \frac{\omega\rho}{\upsilon} \tag{1}$$

Wheelslip 50 may also occur due to torque applied to wheel 24, as indicated by pinion 52, resulting in the need for traction control.

Figure 3:
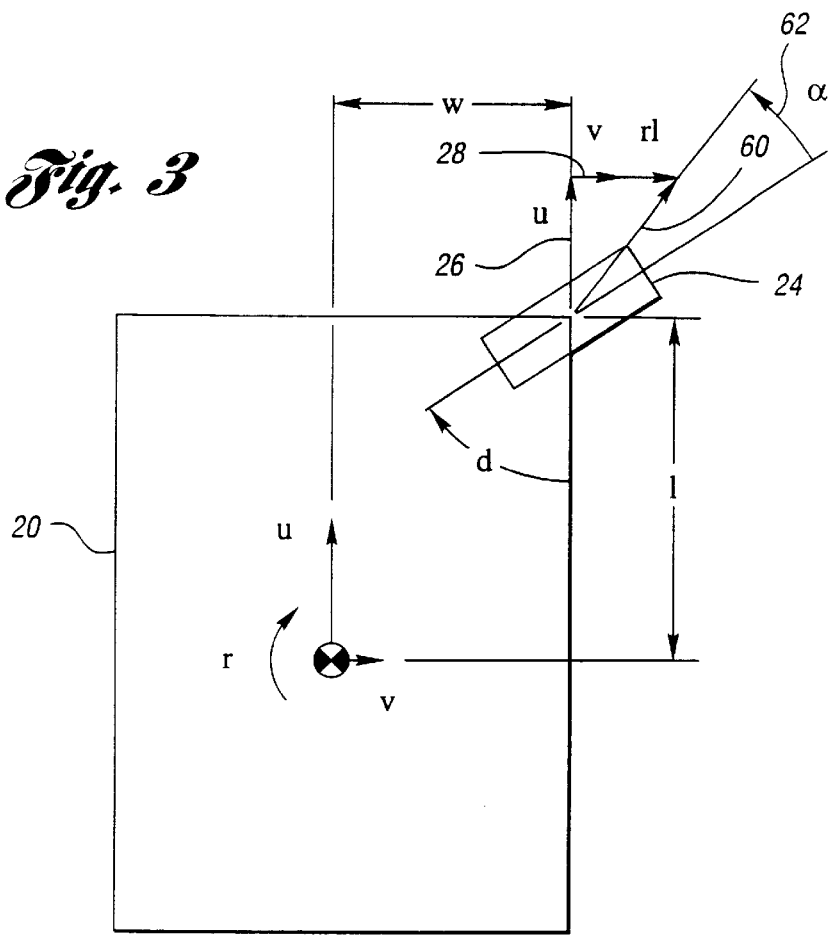
FIG. 3 is a schematic diagram showing a wheel top view for defining slip angle.

Referring now to FIG. 3, a schematic diagram showing a wheel top view for defining slip angle is shown. Wheel 24 is in contact with road surface 42 and is steered through steering angle d relative to the longitudinal axis of vehicle 20. Wheel 24 is located a longitudinal distance l and a lateral distance w from the center of mass of vehicle 20. The dimensions l and w are taken as positive when they are directed in the positive directions of the x and y axes respectively.

The velocity of the center of the wheel, shown as 60, is the velocity that an object rigidly attached to vehicle 20 and located at the center of wheel 24 would have. Wheel center velocity 60 can be found by applying kinematics. An approximation for wheel center velocity assumes that the longitudinal component of wheel center velocity 60 is longitudinal velocity 26 and that the lateral component is rl+v. This approximation is adequate for the present invention and provides an economy of notation. However, this approximation does not need to be made. The cross product of yaw rate 30 and a displacement vector from vehicle 20 center of mass to the center of wheel 24 may be used to more precisely find wheel center velocity 60.

The slip angle α, shown as 62, is the angle between wheel center velocity 60 and the longitudinal axis of wheel 24. The cornering forces that wheel 24 generates as it is steered are a function of slip angle 62. Slip angle 62 shown is negative because it is measured in a counter-clockwise direction from the longitudinal axis of wheel 24. An approximate equation for slip angle 62 is shown in Equation 2:

$$\alpha = \frac{v + rl}{u} - d \tag{2}$$

Figure 4:
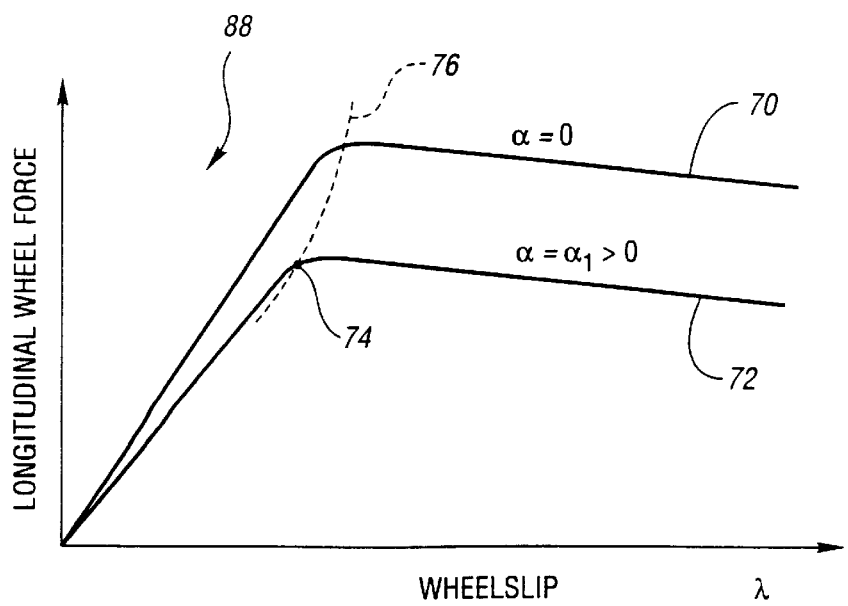
FIG. 4 is a graph of the magnitude of longitudinal wheel force characteristics as a function of wheelslip.

Referring now to FIG. 4, a graph of longitudinal wheel force characteristics as a function of wheelslip is shown. Longitudinal wheel forces are braking and accelerating forces along the longitudinal axis of wheel 24. The negative of the wheel forces is plotted to make the graph easier to interpret. In terms of the coordinate systems chosen, braking forces are actually negative forces.

Two curves are drawn on the longitudinal wheel force graph. Curve 70 shows longitudinal wheel force for slip angle 62 of zero. Curve 72 shows longitudinal wheel force for slip angle 62 greater than zero. Increasing the magnitude of slip angle 62 lessens the magnitude of the longitudinal wheel force at any particular level of wheelslip 50.

Along any longitudinal wheel force curve, such as 72, the longitudinal wheel force varies almost linearly with wheelslip 50 up to wheelslip threshold λ*, shown as point 74. The location of wheelslip threshold 74 varies with slip angle 62, as shown by locus of wheelslip thresholds 76. Also notice that, beyond locus of wheelslip thresholds 76, the longitudinal wheel force again becomes substantially linear. In fact, it would be possible to define longitudinal wheel force curves using piecewise linear approximations.

Figure 5:
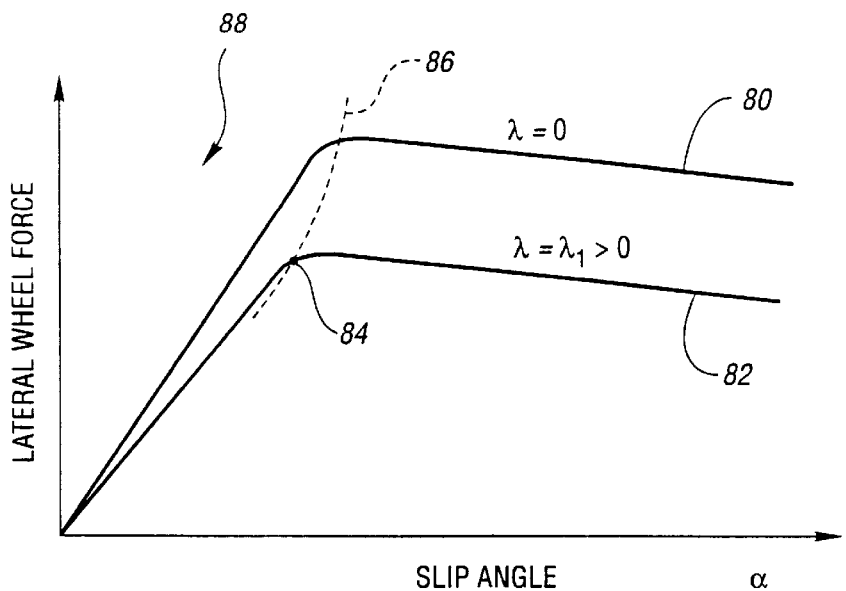
FIG. 5 is a graph of the magnitude of lateral wheel force characteristics as a function of slip angle.

Referring now to FIG. 5, a graph of lateral wheel force characteristics as a function of slip angle 62 is shown. Lateral wheel forces are cornering forces along the lateral axis of wheel 24. The negative of the wheel forces is plotted to make the graph easier to interpret. This is necessary because a positive slip angle 62 creates a force in the negative y direction.

Two curves are drawn on the lateral wheel force graph. Curve 80 shows lateral wheel force for wheelslip 50 of zero. Curve 82 shows lateral wheel force for wheelslip 50 greater than zero. Increasing the magnitude of wheelslip 50 lessens the magnitude of the lateral tire force at any particular level of slip angle 62.

Along any lateral wheel force curve, such as 82, the lateral wheel force varies almost linearly with slip angle 62 up to slip angle threshold α*, shown as point 84. The location of slip angle threshold 84 varies with wheelslip 50, as shown by locus of slip angle thresholds 86. Also notice that, beyond locus of slip angle thresholds 86, the lateral wheel force again becomes substantially linear. In fact, it would be possible to define lateral wheel force curves using piecewise linear approximations.

Based upon the discussion with regards to FIGS. 4 and 5 above, the bilinear tire force equations can be derived, as is known in the art. The longitudinal tire force equation is shown in Equation 3:

$$F_{longitudinal} = n(s_1 - h_1|\alpha|)\lambda = F_1 \quad (3)$$

and the lateral tire force equation in Equation 4:

$$F_{lateral} = n(s_2 - h_2|\lambda|)\alpha = F_2 \quad (4)$$

where the coefficients $s_1$, $s_2$, $h_1$, and $h_2$ are selected to fit the equations to empirical tire force data. These coefficients are negative numbers in terms of the coordinate system chosen. Equations 3 and 4 apply when ever $\lambda < \lambda^*$ and $\alpha < \alpha^*$.

Often, the locus of $\lambda^*$ and $\alpha^*$ is estimated by the elliptic equation of Equation 5:

$$\lambda^{*2} + \zeta\alpha^{*2} = \xi^2 \quad (5)$$

where and $\xi$ are $\epsilon$ constants used to fit the tire model to properties of tire 24.

The interior of this ellipse satisfies $\lambda < \lambda^*$ and $\alpha < \alpha^*$ and is known as the bilinear tire region, shown generally as 88 in FIGS. 4 and 5. In a preferred embodiment, the focus will be on maintaining the wheelslips 50 and slip angles 62 inside bilinear tire region 88. Inside bilinear tire region 88, wheels 24 remain responsive to braking and steering inputs. By staying inside bilinear tire region 88, vehicle 20 maintains good steering response.

It is not necessary for the present invention, however, to operate within bilinear tire region 88. By starting with piecewise linear equations for the wheel forces, the ideas and concepts embedded in this invention can be extended to operation outside bilinear tire region 88.

Before the stability methods can be employed, a model for vehicle 20 is introduced. The model can be derived by considering the bilinear tire equations, Equations 3 and 4, as well as slip angle 62 approximation in Equation 2. Beginning with the dynamic equations for a rigid body in a yaw plane, results in Equation 6 describing longitudinal dynamics:

$$m_v(\dot{u} - rv) = \sum_i F_{xi} = \sum_i F_{1i} - \sum_i F_{2i}d_i \quad (6)$$

Equation 7 describing lateral dynamics:

$$m_v(\dot{v} + ru) = \sum_i F_{yi} = \sum_i F_{2i} + \sum_i F_{1i}d_i \quad (7)$$

and Equation 8 describing rotational dynamics:

$$I_z\dot{r} = \sum_i M_{zi} = \sum_i F_{1i}(d_il_i - w_i) + \sum_i F_{2i}(d_iw_i + l_i) \quad (8)$$

where i is the number of wheels 24, $m_v$ is the mass of vehicle 20, $I_z$ is the mass moment of inertia about the z axis of vehicle 20, $F_{1i}$ is the longitudinal wheel force for wheel i, $F_{2i}$ is the lateral wheel force for wheel i, $l_i$ is the longitudinal distance to wheel i, and $w_i$ is the lateral distance to wheel i. Each of the right hand equations assumes that steering angles 32 are less than 20°, otherwise using $\sin(d_i)$ is more appropriate than using $d_i$ and $\cos(d_i)$ should multiply all terms not containing $\sin(d_i)$.

By substituting the bilinear tire force equations shown in Equations 3 and 4 as slip angle 62 approximation into Equations 6 through 8, the dynamic equations for the vehicle can be placed in the form of Equation 9:

$$\dot{u} = f(u,x,d,n,t,p) + U(u,x,d,n,t,p)\lambda$$

$$\dot{x} = A(u,t,p)x + B(t,p)d + D(u,x,d,n,t,p)\lambda + \gamma(u,x,d,n,t,p) \quad (9)$$

where nw is the number of wheels, $M^T$ is the transpose of matrix M, and $$x = (v, r)^T$$

$$p = (m_v, I_z, l_1, \ldots, l_{nw}, w_1, \ldots, w_{nw})^T$$

$$t = (s_{11}, \ldots, s_{2,nw}, h_{11}, \ldots h_{2,nw})^T$$

$$f = rv - \sum_i s_{2i}n_id_i((v + rl_i)/u - d_i)/m_v$$

$$U_{1j} = \{s_{1j} + h_{2j}d_j((v + rl_j)/u - d_j) - h_{1j}|(v + rl_j)/u - d_j|\}n_j/m_v$$

$$A_{11} = \sum_i s_{2i}n_i/um_v$$

$$A_{12} = -u + \sum_i l_is_{2i}n_i/um_v$$

$$A_{21} = \sum_i s_{2i}n_i(l_i + d_iw_i)/uI_z$$

$$A_{22} = \sum_i s_{2i}l_i(l_i + d_iw_i)/uI_z$$

$$B_{1i} = -s_{2i}n_i/m_v$$

$$B_{2i} = -s_{2i}n_il_i/I_z$$

$$D_{1j} = \{d_js_{1j} - [((v + rl_j/u - d_j)h_{2j}) + |(v + rl_j)/u - d_j|h_{1j}d_j]\}n_j/m_v$$

$$D_{2j} = \{s_{1j}(d_jl_j - w_j) - [|(v + rl_j)/u - d_j|h_{1j}(d_jl_j - w_j) +$$

$$((v + rl_j)/u - d_j)h_{2j}(d_jw_j + l_j)]\}n_j/I_z$$

$$\gamma_{11} = 0$$

$$\gamma_{21} = \sum_i -s_{2i}n_iw_id_id_i$$

Equation 9 is referred to as the linear-in-wheelslip yaw-plane equations. For combination vehicles, such as tractor/trailer combinations, there can be many more components in the vector x.

Figure 6:
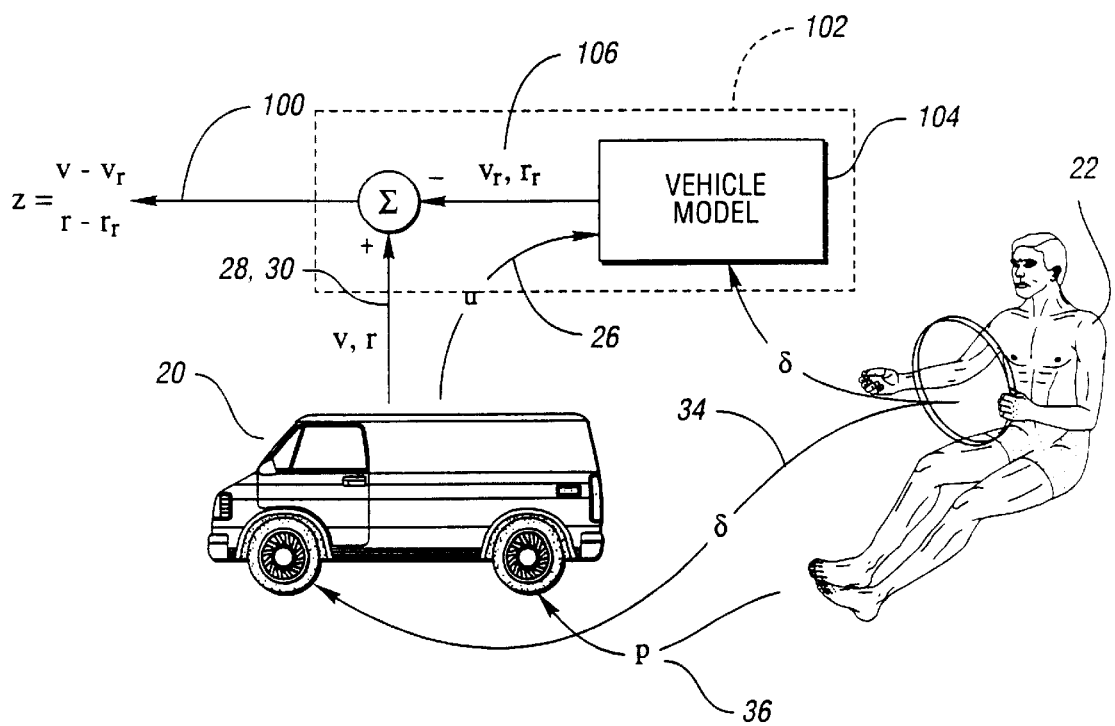
FIG. 6 is a block diagram of a trajectory error generator according to the present invention.

Referring now to FIG. 6, a block diagram of a trajectory error generator according to the present invention is shown. If vehicle 20 is sliding sideways more than expected or rotating more than expected, lateral velocity 28 and yaw rate 30 are indications that the vehicle is losing directional stability. The difference between the actual stability variables and their expected values will be called the "trajectory" error and will be given the symbol z, shown by 100.

Trajectory error generator 102 has inputs including vehicle velocity variables 26,28,30 or estimates of such and driver commands 34. Commands from driver 22, such as driver steering input 34, are input to vehicle model 104 to calculate expected (or desired) vehicle trajectory 106. Trajectory error 100 is actual vehicle stability variables 28,30 minus expected vehicle trajectory 106. In the embodiment shown in FIG. 6, the stability variables v and r where chosen, but equivalent or additional variables could have been chosen.

Certain auxiliary variables related to heading error can be beneficially applied in stability enhancement systems. These variables can easily be incorporated in the subject invention.

A method for deriving trajectory error 100 is now described. A reference system is established of the form shown in Equation 10:

$$\dot{x}_r = A_rx_r + B_rd \quad (10)$$

Usually $A_r$ is a good approximation of A and $B_r$ is a good approximation of B as described with regards to Equation 9 above. However, $A_r$ and $B_r$ can be chosen to reflect the handling characteristics desired from vehicle 20.

Now, trajectory error 100 can be defined as Equation 11:

$$z = x - x_r \tag{11}$$

with dynamics described by Equation 12:

$$\dot{z} = \dot{x} - \dot{x}_r \tag{12}$$

Subtracting the dynamics equation of the reference model from the dynamics equation of the stability variables yields Equation 13:

$$\dot{z} = A_r z + D\lambda + (\gamma + m) \tag{13}$$

where m is a vector of model mismatch terms which depend upon $A-A_r$ and $B-B_r$ and $\gamma$ is a vector containing nonlinear terms of the trajectory error propagation equation. Equation 13 describes the dynamics of trajectory error 100. This equation shows that the trajectory error rate of change is effected by wheelslips 50 through the D matrix.

It is important to establish a means for measuring the severity of particular trajectory errors 100. This requires a measure of trajectory error. The measure is a positive semidefinite function of the trajectory error components. Regardless of the number of variables chosen to represent trajectory error 100, the measure assigns a value reflecting severity to every combination of these variables.

Figure 7:
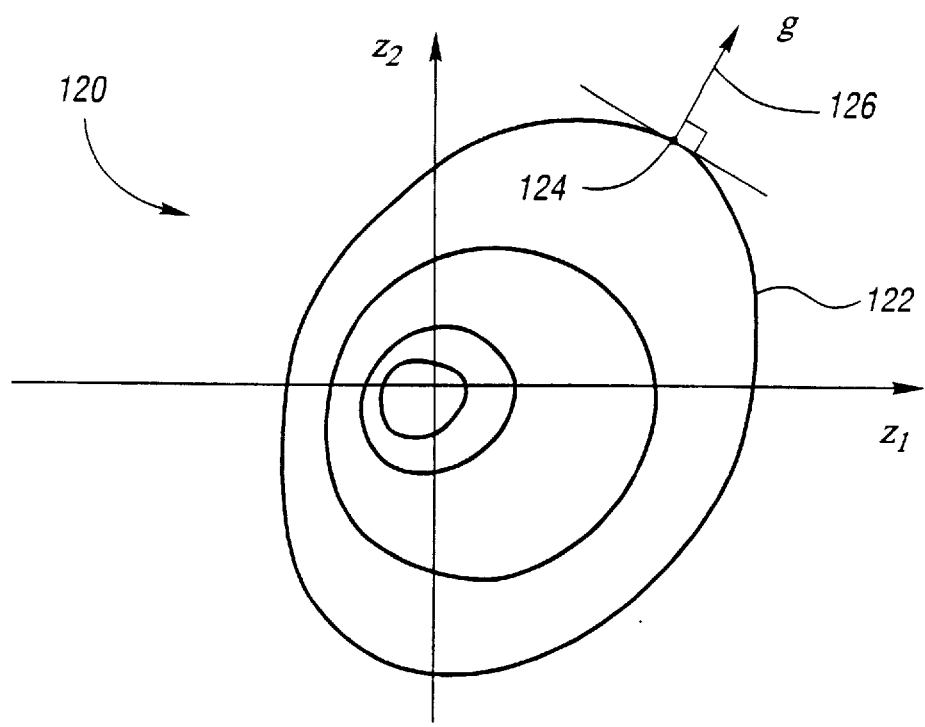
FIG. 7 is a graphical illustration of the concept of a trajectory error measure and its gradient as used in the present invention.

Referring now to FIG. 7, a graphical illustration of the concept of a trajectory error measure and its gradient as used in the present invention is shown. A trajectory error measure m, shown generally by 120, is a function of two variables in this illustration as represented by the horizontal and vertical axes. For example, the horizontal axis could be the sideslip velocity error and the vertical axis could be the yaw rate error.

The values of measure 120 are represented by a set of contour lines, one of which is indicated by 122. Each contour line 122 passes through those combinations of the trajectory error that yield the same value of trajectory error measure 120. A single point 124 on contour line 122 is chosen for inspection. The direction of steepest ascent at point 124 is indicated by gradient g, shown as 126.

By placing restrictions on the type of measure 120 to be used, beneficial results regarding stability can be obtained. These results fall in the domain of Lyapunov Methods, which are a well known set of methods for determining and regulating the stability of systems. In order to apply Lyapunov Methods, measure 120 must be positive definite.

There are exact specifications for measure 120 to be considered positive definite. Considering these specifications results in a set of observations. First, contours 122 will form a nested set where, as the value of measure 120 increases, each successive contour 122 encloses those contours 122 for lower values of measure 120. Second, the smaller the value of measure 120, the more closely its associated contour 122 encircles the origin. Third, the zero value of measure 120 applies only at the origin. Fourth, the curves of contours 122 are smooth and continuous.

Measure 120 is also allowed to change in time if, at each and every instant of time, measure 120 is positive definite. In the preferred embodiment, measure 120 is time varying.

How trajectory error measure 120 changes as trajectory error 100 changes can be determined using gradient 126 of measure 120 and the partial derivative of measure 120 with respect to time, as in Equation 14:

$$\dot{m} = g^T \dot{z} + \frac{\delta m}{\delta t} \tag{14}$$

Equation 14 gives the time rate of change of measure 120 due to the sum of two components.

Lyapunov Theory states that, if the time-rate-of-change of measure 120 can be kept almost always negative and never positive as trajectory error 100 evolves, then the system will return to the origin. Since the origin is the zero vector, all the components of trajectory error 100 go to zero. Hence, if the time-rate-of-change of measure 120 is kept negative, the components of trajectory error 100 will move towards zero. This concept makes intuitive sense. If measure 120 is constantly moving to lower values, contour lines 122 of lower values are being crossed until the origin is ultimately reached.

However, always maintaining a negative rate of change of trajectory error measure 120 is too strict of a requirement for a brake system. First, it is undesirable for brakes 44 to rapidly apply and release when trajectory error 100 is small because vehicle 20 would experience jerky behavior. Second, it is difficult to measure small trajectory errors 100 since there is always noise on sensor signals. Third, ground vehicles 20 are constantly subjected to small disturbance due to imperfections in road surface 42 and to random vibrations.

In a preferred embodiment, small trajectory errors 100 are ignored and only relatively large trajectory errors 100 are considered. This can be accomplished by requiring the time rate of change of measure 120 to be negative only when the value of measure 120 is above some threshold, Q. For example, if the time-rate-of-change of measure 120 is required to be negative whenever measure 120 exceeds Q, then the trajectory error will tend to be maintained inside a region contained inside contour 122 corresponding to Q. Since the system will always be subjected to random disturbances that may cause it to be knocked beyond the contour temporarily, trajectory error 100 may not always be maintained inside measure 120 threshold.

One way to formulate a reasonable bound on trajectory error 100 is to impose a constraint of the form shown in Equation 15:

$$\dot{m} = g^T \dot{z} + \frac{\delta m}{\delta t} < b(m, t, \ldots) \tag{15}$$

where constraint b can be a function of many things, including the value of measure 120 and the time, t.

Figure 8:
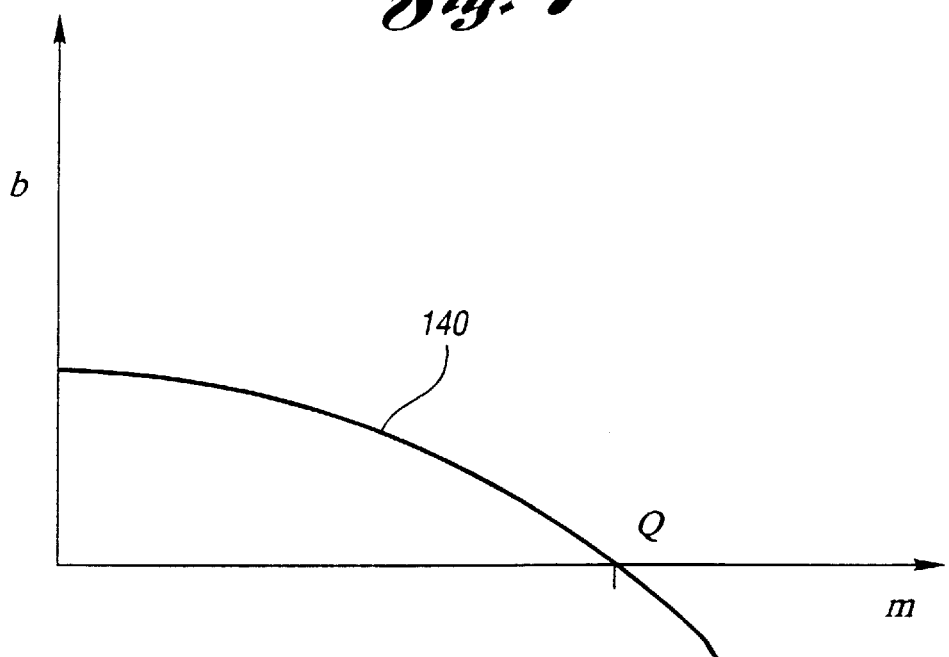
FIG. 8 is a graph plot of an exemplary choice for a constraint function according to the present invention.

Referring now to FIG. 8, a graph plot of an exemplary choice for a constraint function according to the present invention is shown. Constraint 140 is shown as a function of trajectory error measure 120. The selection of constraint 140 is the method for tuning the behavior of the controller. The smaller (or more negative) that b is, the more aggressively brakes 44 operate towards stability enhancement. The best approach is to set b so that the controller ignores small disturbance (i.e., when m is small), but becomes very active when disturbances grow large (i.e., when m is large). FIG. 8 shows a plot of b versus m that allows trajectory errors to grow when m is less than Q.

Next, a suitable trajectory error measure 120 is described. Measure 120 can be obtained by using the Lyapunov Matrix Equation as shown in Equation 16:

$$PA_r + A_r^T P = -R \tag{16}$$

Equation 16 yields a positive definite solution P for stable $A_r$ and positive definite R. This is a linear equation and can be solved quickly and easily. Since P is positive definite it can be used to generate a positive definite function to use as measure 120. P has the property shown in Equation 17 that $$z^T P z > 0, \text{ whenever } |z| > 0 \qquad (17)$$

Since proposed measure 120 is positive definite, it can be used to apply Lyapunov stability methods.

However, P does vary with time. In Equation 16 defining P appears $A_r$, which is a function of u. The time rate of change of P is found as Equation 18:

$$\frac{\delta P}{\delta u} \dot{u} \qquad (18)$$

where, in Equation 19, $$\frac{\delta P}{\delta u} A + A^T \frac{\delta P}{\delta u} = -\left(P \frac{\delta A}{\delta u} + \frac{\delta A^T}{\delta u} P\right) \qquad (19)$$

Equation 19 is also a Lyapunov Matrix Equation. It can be solved easily to obtain $\delta P/\delta u$. Using this, the stability constraint of Equation 15 becomes Equation 20:

$$\dot{m} = 2z^T P \dot{z} + z^T \frac{\delta P}{\delta u} z \dot{u} < b(m, t, \ldots) \qquad (20)$$

It should be noted that the stability constraint can be any linear constraint on wheelslips 50. In the preferred embodiment described above, stability constraint is derived from a positive definite Lyapunov function and, as such, provides mathematical connections to stability. However, it is possible to derive workable constraints in many ad-hoc ways.

For example, suppose the absolute value of the yaw rate error, $r_e$, is to be regulated. In this case, measure 120 is $|r_e|$. Consider the requirement shown in Equation 21:

$$\frac{d|r_e|}{dt} = \dot{r}_e \text{sign}(r_e) < 0 \text{ whenever } |r_e| > c \qquad (21)$$

where c is some positive constant and sign ($r_e$) is the sign of $r_e$ (±1). Using Equation 21 in Equation 13 produces Equation 22:

$$\dot{r}_e = (A[2;]z + D[2;]\lambda + \gamma[2;1] + m[2;1]) \qquad (22)$$

where A[2;] is the second row of A. Hence, the stability constraint is shown by Equation 23:

$$(A[2;]z + D[2;]\lambda + \gamma[2;1] + m[2;1])\text{sign}(r_e) < 0 \text{ whenever } |r_e| > c \qquad (23)$$

which is a linear constraint on wheelslip 50.

The control algorithm according to the present invention will now be described. The control algorithm includes solving of two optimization problems, a minimization problem and a maximization problem. The minimization problem determines the most negative acceleration that can be achieved, while maintaining stability, and determines wheelslips 50 required to achieve this. The maximization problem determines the most acceleration that can be achieved, while maintaining stability, and determines the wheelslips 50 required to achieve this.

When the acceleration demanded by driver 22 lies between the minimum and maximum accelerations, corresponding to the solutions of the two optimization problems, the wheelslip command is found by interpolation of the wheelslip solutions of the two optimization problems.

When the acceleration demanded by driver 22 falls outside the range between the minimum and maximum accelerations, corresponding to the solutions of the optimization problems, the wheelslip command is set to the solution of the optimization problem that comes closest to satisfying the demand of driver 22.

The first optimization problem finds wheelslips 50 that minimize (make as negative as possible) the time rate of change of vehicle kinetic energy while maintaining stability and controllability. First, the form for the minimization will be shown, then terms will be described.

The minimization problem has the form shown in Equations 24 through 26. Mathematically, wheelslips 50 are found satisfying Equation 24:

$$\text{minimize } E\gamma \qquad (24)$$

while maintaining the constraint in Equation 25:

$$0 \leq \lambda \leq \lambda^* \qquad (25)$$

and while maintaining the constraint in Equation 26:

$$k^T D\lambda \leq \hat{b} \qquad (26)$$

In general, vehicle trajectory is described by ns stability variables. In an embodiment of the present invention, vehicle trajectory will be described by two variables, lateral velocity 28 and the yaw rate 30.

The 1×nw row vector E indicates the effects that the nw wheelslips have on the rate of change of weighted vehicle kinetic energy. In a preferred embodiment, the objective will be to minimize the time rate of change of the square of longitudinal velocity 26, as indicated in Equation 27:

$$\text{minimize} \frac{du^2}{dt} = \text{minimize } 2u\dot{u} \qquad (27)$$

which is equivalent to minimizing $\dot{u}$ when u is nonnegative. If u is negative, vehicle 20 is moving backwards, and modifications to the vehicle dynamics and other formulations are required. Substitution of Equation 9 into Equation 27 for $\dot{u}$ results in Equation 28:

$$\text{minimize } 2u(U\lambda + f) \qquad (28)$$

Since only wheelslip 50 is involved in the minimization, Equation 28 simplifies to Equation 29, assuming u is greater than zero:

$$\text{minimize } U\lambda \qquad (29)$$

When U is used for E, the objective is equivalent to minimizing (making as negative as possible) the rate of change of vehicle longitudinal velocity 26. Since the time rate of change of longitudinal velocity depends on wheelslip in the same manner as does longitudinal acceleration, minimizing the time rate of change of longitudinal velocity over wheelslip also minimizes the longitudinal acceleration over wheelslip.

Using the more general E instead of U allows other forms of velocity such as, for example, sideslip velocity 28 or yaw rate 30 to be included in weighted vehicle kinetic energy. For an alternate embodiment, the relationship of Equation 30 can be used:

$$\text{minimize} \frac{d}{dt}(u^2 + v^2) \Rightarrow \text{minimize}(uU + vD[1;])\lambda \quad (30)$$

where D[1;] is the top row of D. In this embodiment, E is expressed as Equation 31:

$$E = uU + vD[1;] \quad (31)$$

The matrix D is a ns×nw matrix. The $i^{th}$ row indicates the effects that the niw wheelslips have on the rate of change of the $i^{th}$ element of vehicle trajectory. The minimization of Equation 30 is the same as minimizing the velocity weighted magnitude of the acceleration vector.

The vector z is a ns×1 vector showing the trajectory error of vehicle 20. Normally z will have two components, relating to the longitudinal velocity error and to the lateral velocity error, but higher order vehicle models may be used.

The vector k is a ns×1 weighting vector based on the stability constraint type. If measure 120 $z^T P z$ is used, then k=g=2Pz.

The vector λ* is a nw×1 vector showing wheelslip threshold 74 for each wheelslips 50.

The constraint in Equation 25, λ≤λ*, keeps wheels 24 operating below the wheelslip level at which braking tire forces level out. This constraint keeps wheels 24 below saturation and maintains good steering response. However, in an alternate embodiment it is possible to go beyond λ* if a piecewise linear wheel force equation is used. Wheelslips 50 would have to be broken into intervals over which the wheel forces were adequately linear, creating additional wheelslip variables. This modification could be applied to all optimization problems that follow.

Stability constraint Equation 26 has a right hand side variable $\hat{b}$ which can be related to b appearing in Equation 15 by Equation 32:

$$\hat{b} = b - g^T(A_r z + \gamma + m) - \frac{\delta m}{\delta t} \quad (32)$$

In other situations, $\hat{b}$ will be any terms brought to the right hand side of a constraint equation after isolating, on the left hand side, those terms depending on wheelslip 50.

Equations 24 through 26 have the form of a Linear Program. Linear Programs are well known and highly studied forms of optimization problems. In general, an algorithm is required to solve a Linear Program since most do not have closed form solutions. However, the Linear Program represented by Equations 24 through 26 has a special form that leads to a rule-based method for solution Each element of E, denoted as $e_i$ and referred to as the acceleration effect, is roughly the effect that applying the corresponding $\lambda_i$ will have on acceleration. Since applying $\lambda_i$ will reduce the kinetic energy of vehicle 20, the acceleration effect $e_i$ will normally be negative.

Each element of $k^T D$, denoted as $s_i$ and referred to as the stability effect, is the effect that applying the corresponding $\lambda_i$ will have on the rate of change of trajectory error measure 120.

If measure 120 is also a Lyapunov function, there is a direct connection between measure 120 and stability. A positive $s_i$ implies an increase in the rate of change (and a decrease in the rate of reduction) of trajectory error measure 120 and implies diminished stability. The term stability is being used synonymously for the rate of reduction of trajectory error measure 120. Increasing stability means making the rate of change of trajectory error measure 120 more negative.

The rules that follow depend on the sign of each $s_i$ and on the ratio of $e_i$ to $s_i$, i.e., the ratio of the acceleration effect to the stability effect.

Applying a particular $\lambda_i$ can either cause an increase or a decrease in stability. This is because braking at wheel 24 creates torque on the vehicle that can either reduce or amplify a disturbance. If the sign of $s_i$ is negative, applying the corresponding $\lambda_i$ will enhance stability, hence $s_i$ will be said to be a stability enhancing stability effect. If the sign of $s_i$ is positive, applying the corresponding $\lambda_i$ will diminish stability, hence $s_i$ will be said to be a stability diminishing stability effect.

As mentioned, the wheelslip command generator considers the effects that each wheelslip 50 would have on acceleration and the rate of change of trajectory error measure 120. This information is then processed as follows.

An algorithm for mimimizing the acceleration (maximizing the deceleration) while maintaining stability can now be given. The algorithm describes the operation of a wheelslip command generator that has been given the inputs λ*, D, E, and k. The wheelslip command generator has also been told that the objective is to maximize the deceleration while maintaining stability and maintaining the wheelslips below λ*.

Each wheelslip 50 with stability enhancing stability effect, $s_i$, is found. These first group wheelslips 50 increase stability. Each $\lambda_i$ in this first set is set to the corresponding $\lambda^*_i$. Each first set wheelslip 50 has now been determined.

The stability constraint in Equation 26 is decomposed into terms involving determined wheelslips 50 and not determined wheelslips 50. The stability constraint of Equation 26 is equivalent to Equation 33:

$$\sum_i s_i \lambda_i \leq \hat{b} \quad (33)$$

Once certain values of $\lambda_i$ have been determined then Equation 33 can be written as Equation 34:

$$\sum_{\text{not determined}} s_i \lambda_i \leq \hat{b} - \sum_{\text{determined}} s_i \lambda^*_i \quad (34)$$

Equation 34 is called the decomposed stability constraint equation. The right hand side of Equation 34 represents the stability surplus, or the stability condition, K, as expressed in Equation 35:

$$K = \hat{b} - \sum_{\text{determined}} s_i \lambda^*_i \quad (35)$$

If the stability condition is less than or equal to zero, there are no feasible non-zero choices for the remaining $\lambda_i$ in the second group that can ever satisfy the stability constraint since their stability effect multipliers are all positive. Hence, all non-determined $\lambda_i$ are set to zero. This results in the best solution even though stability is not satisfied. If this occurs, the algorithm is then exited.

If the stability condition is greater than zero, the next wheelslip 50 to be brought on is determined. Recall that the stability effect of the remaining $\lambda_i$ (those to be determined) are positive. For each remaining wheelslip 50, determine wheel 24 for which the ratio of $e_i$ to $s_i$ is most negative. The corresponding $\lambda_i$ will have the greatest effect on increasing deceleration per effect of decreasing stability. Call this wheelslip 50 $\lambda_{next}$, the next wheelslip 50 to be considered.

It must be determined if all of $\lambda_{next}$ can be used. It is desirable to set $\lambda_{next}$ to its wheelslip threshold 74 $\lambda^*_{next}$, but this might cause a violation of the stability constraint. Once again, the decomposed stability constraint equation will be used. The revised right hand side, or the stability condition, must remain greater than zero after determining $\lambda_{next}$, therefore the decision expressed in Equation 36 is used:

$$\lambda_{next} = \min\left\{\lambda^*_{next}, \frac{\hat{b} - \sum_{determined} s_i\lambda^*_i}{s_{next}}\right\} \quad (36)$$

and $\lambda_{next}$ is marked as having been determined.

The process of determining the stability condition, selecting next wheelslip 50 to bring on if the constraint is greater than zero, and determining the value of next wheelslip 50 is repeated until no wheelslips remain or until the surplus stability is exhausted.

Modifications to this algorithm are possible within the spirit and scope of the present invention. In one embodiment, for example, all $\lambda_i$ can be set to the corresponding $\lambda^*_i$ and the stability condition can be checked. If the stability condition is satisfied then the algorithm is completed, otherwise the second group of wheelslips 50 is reduced, starting with wheelslip 50 having the least negative ratio of $e_i$ to $s_i$, and proceeding, according to this ratio, to reduce the group two wheelslips brought on until the stability condition is satisfied.

The present invention uses the solution of another optimized problem closely related to the minimization problem just discussed. This problem is the maximization problem of Equation 37:

$$\text{maximize } E\lambda \quad (37)$$

while maintaining the constraint in Equation 38:

$$k^T D\lambda \leq \hat{b} \quad (38)$$

and while maintaining the constraint in Equation 39:

$$0 \leq \lambda \leq \lambda^* \quad (39)$$

The optimization problem requires maximization instead of minimization. A brief description of a rule based method for solving this problem is described.

Whenever $\hat{b}$ is greater than or equal to zero the solution is simply the zero vector, meaning no wheelslips 50 (no braking) is required.

If $\hat{b}$ is less than zero, the only way the stability constraint in Equation 38 can be satisfied is to use wheelslips 50 from the first group. Recall the first group wheelslips have negative stability effects, $s_i$, and only these can produce a negative left side and satisfy the inequality shown in Equation 38. The first group wheelslips are applied beginning with wheelslip 50 that has the smallest ratio $e_i/s_i$. This wheelslip 50 is increased until it satisfies the stability constraint of Equation 38 or until it reaches the corresponding $\lambda^*$. This process continues until one or more of the first group wheelslips manages to satisfy the stability constraint or until all of the first group wheelslips are at their corresponding $\lambda^*$. The probability of this latter result is extremely rare and would indicate that trajectory error measure 120 is so great that brakes 44, even with maximum effort, cannot maintain stability.

Figure 9:
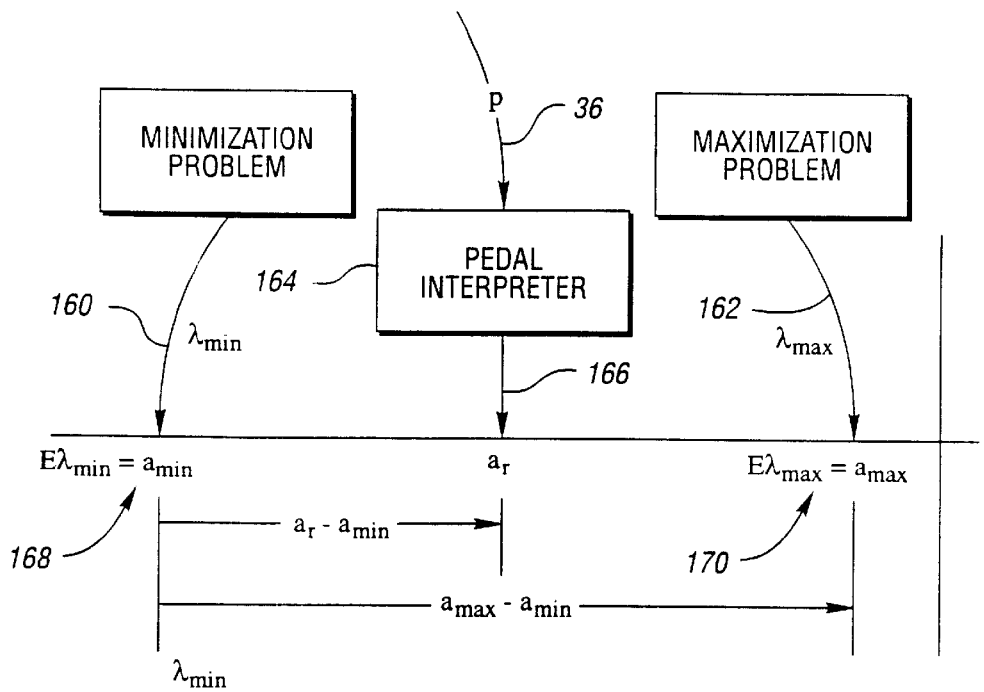
FIG. 9 is a schematic diagram of the wheelslip command generating algorithm illustrating combination of the solutions of the two optimization problems according to the present invention.

Referring now to FIG. 9, a schematic diagram of the wheelslip command generating algorithm illustrating a combination of the solutions of the two optimization problems according to the present invention is shown. A method for combining the solutions to the minimization and maximization optimization problems can be described. Let the solution of the minimization problem be called minimizing wheelslips, $\lambda_{min}$, shown as 160, and let the solution of the maximization problem be called maximizing wheelslips, $\lambda_{max}$, shown as 162.

Assume that pedal command 36 from driver 22 maps to some desired value for weighted vehicle kinetic energy, which yields an $E\lambda$ through pedal interpreter 164. Let the desired value of $E\lambda$ be called desired acceleration, $a_r$, shown as 166. In the simple case where the weighted measure is the square of longitudinal velocity 26, pedal command 36 maps to the desired value of $U\lambda$, which is the component of the longitudinal acceleration attributable to braking forces from wheels 24. This points out that pedal command 36 is being mapped to something very close to deceleration. In fact, under most circumstances, driver 24 would feel that increasing the pedal pressure resulted in a proportionate increase in vehicle deceleration. A possible implementation of pedal interpreter 164 would map brake pressure 36, as might be measured by master brake cylinder pressure, to acceleration. The mapping may be linear, with no rake pressure 36 corresponding to no acceleration 166 and maximum brake pressure 36 corresponding to a preset maximum acceleration 166 such as 1 g.

The minimum acceleration (maximum deceleration) attributable to wheelsup 50 is $a_{min}$, shown generally by 168, calculated as in Equation 40:

$$a_{min} = E\lambda_{min} \quad (40)$$

The maximum acceleration (minimum deceleration) attributable to wheelslip 50 is $a_{max}$, shown generally by 170, calculated as in Equation 41:

$$a_{max} = E\lambda_{max} \quad (41)$$

Depending on the value of $a_r$ relative to $a_{min}$ and $a_{max}$, the solution is either an interpolation of the two optimal solution, or one of the two optimal solutions. In a preferred embodiment, the interpolation is a linear interpolation as in Equation 42: for:

$$a_r < a_{min}, \lambda_{solution} = \lambda_{min} \quad (42)$$

$$a_r > a_{max}, \lambda_{solution} = \lambda_{max}$$

$$a_{min} < a_r < a_{max}, \lambda_{solution} = \lambda_{min} + \frac{(\lambda_{max} - \lambda_{min})(a_r - a_{min})}{a_{max} - a_{min}}$$

Although linear interpolation is shown, other forms of interpolation can be used.

The wheelslip command generated from the two optimization problems has some excellent properties. These are now listed and discussed.

1. When $a_r > a_{max}$, and $\lambda_{solution} = \lambda_{max}$:

This situation occurs when driver 22 is asking for less deceleration than the control system calculates is necessary to maintain stability. Included in this scenario is the situation where driver 22 may be asking for little if any deceleration, but the brake controller finds it necessary to partially apply some of brakes 44 to help stabilize vehicle 20. Under these conditions the brake controller is acting in an optimal way since the solution is the wheelslip command that is the direct result of the maximization problem. Vehicle 20 will maximize the acceleration (keep deceleration to a minimum) while maintaining stability.

2. If $a_r < a_{min}$ and $\lambda_{solution} = \lambda_{min}$:

This situation occurs when driver 22 is asking for more deceleration than the control system calculates can be delivered while maintaining stability. Included in this scenario are situations where driver 22 is trying to make a hard stop under difficult road conditions, such as when there is significantly more traction on one side of vehicle 20 than on the other. Under these conditions the brake controller is acting in an optimal way since the wheelslip command is the direct result of the minimization problem. Vehicle 20 will minimize acceleration (keep deceleration to a maximum) while maintaining stability.

3. If $a_{min} < a_r < a_{max}$, and $$\lambda_{solution} = \lambda_{min} + (\lambda_{max} - \lambda_{min})(a_r - a_{min})/(a_{max} - a_{min}):$$

Under these conditions, driver 22 will essentially achieve the desired level of acceleration (deceleration) in accordance with pedal command 36. To see this, consider Equation 43:

$$E\lambda_{solution} = E\lambda_{min} + \frac{(E\lambda_{max} - E\lambda_{min})(a_r - a_{min})}{a_{max} - a_{min}} \quad (43)$$

$$= a_{min} + \frac{(a_{max} - a_{min})(a_r - a_{min})}{a_{max} - a_{min}}$$

$$= a_r$$

Optimization is not an issue because there may be many combinations of wheelslips 50 that provide the same acceleration. However, the wheelslip solution presented does guarantee that stability will be maintained. To see this consider Equation 44:

$$k^T D\lambda_{solution} = k^T D\lambda_{min} + \frac{(k^T D\lambda_{max} - k^T D\lambda_{min})(a_r - a_{min})}{a_{max} - a_{min}} \quad (44)$$

Two cases can be considered. If b<0, then $k^T D\lambda_{max} = b$ and $k^T D\lambda_{min} = b^- \leq b$ from which follows Equation 45:

$$k^T D\lambda_{solution} = k^T D\lambda_{min} + \frac{(k^T D\lambda_{max} - k^T D\lambda_{min})(a_r - a_{min})}{a_{max} - a_{min}} \quad (45)$$

$$= b^- + \frac{(\hat{b} - b^-)(a_r - a_{min})}{a_{max} - a_{min}} \leq \hat{b}$$

since $0 \leq (a_r - a_{min})/(a_{max} - a_{min}) \leq 1$.

If b>0, then $k^T D\lambda_{max} = 0$ and $k^T D\lambda_{min} = b^- \leq b$ from which follows Equation 46:

$$k^T D\lambda_{solution} = k^T D\lambda_{min} + \frac{(k^T D\lambda_{max} - k^T D\lambda_{min})(a_r - a_{min})}{a_{max} - a_{min}} \quad (46)$$

$$= b^- + \frac{(0 - b^-)(a_r - a_{min})}{a_{max} - a_{min}} \leq 0 \leq \hat{b}$$

Moreover, the interpolated solution has some very logical behavior under normal braking conditions. Suppose that vehicle 20 is relatively stable and $\hat{b}$ is large enough that $\lambda_{max} = 0$ and $\lambda_{min} = \lambda^*$. Then the interpolated solution can be expressed as Equation 47

$$\lambda_{solution} = \lambda^* + \frac{(0 - \lambda^*)(a_r - a_{min})}{a_{max} - a_{min}} \quad (47)$$

$$= \lambda^* \cdot \frac{a_{max} - a_r}{a_{max} - a_{min}}$$

which is a smooth linear increase in wheelslips 50 as the acceleration commanded by driver 22, $a_r$, becomes more negative (i.e., the deceleration commanded becomes greater). So, under normal conditions, wheelslips 50 increase linearly towards $\lambda^*$ as driver 22 increases pedal command 36. Assuming that the elements of $\lambda^*$ are the same, and under most conditions they would be, the wheelslip levels commanded for all wheels 24 will be the same. Normally wheelslips 50 are kept balanced so that all wheels 24 keep the same margin away from $\lambda^*$ and are more resistant to lock-up. Moreover, wheelslip 50 is easier to regulate when it is lower than $\lambda^*$ and brakes 44 operate more smoothly.

The method described above focuses on situations where wheelslips 50 originate from braking torque at wheels 24. However, wheelslips 5 can also originate from engine drive torque. With few modifications, the formulation above can be extended to cover situations involving wheelslips 50 from braking torque and drive torque simultaneously.

Each wheelslip 50 is placed into one of two groups according to whether wheelslip 50 is positive or negative. The basic equation for wheelslip 50, shown in Equation 1, can be a guide in this. Notice that, if rotational wheel rate 40 becomes greater than the free rolling rate, $\upsilon/\rho$, that wheelslip 50 becomes negative. Rotational rate 40 can be greater if the wheel is being driven by the engine, or if it is being driven by the engine harder than it is being braked. Let the set of positive wheelslips 50 be called $\lambda^*$ and the set of negative wheelslips 50 be called $\lambda^-$.

The bilinear tire force equations, Equations 3 and 4, automatically apply to both negative and positive wheelslips 50. However, when the tire force equations are placed into the dynamic equations for vehicle 20, as shown in Equations 9, care must be taken because of the presence of the absolute values of the wheelslips 50 in the lateral force equations. The result of this is that there will be two different U and D matrices in the resulting vehicle dynamics equations. The matrices will be called $U^+$ and $U^-$. The equations for $U^+$ and $D^+$ are identical to those or U and D shown in Equation 9. The equations for and $U^-$ and $D^-$ are expressed in Equation 48:

$$U^-_{1j} = \{s_{1j} - h_{2j}d_j((v+rl_j)/u - d_j) - h_{1j}|(v+rl_j)/u - d_j|\}n_j/m_v \quad (48)$$

$$D^-_{1j} = \{d_j s_{1j} - [-((v+rl_j)/u - d_j)h_{2j} + |(v+rl_j)/u - d_j|]n_j/m_v$$

$$D^-_{2j} = \{s_{1j}(d_j l_j - w_j) - [|(v+rl_j)/u - d_j|h_{1j}(d_j l_j - w_j) -$$

$$((v+rl_j)/u - d_j)h_{2j}(d_j w_j + l_j)]\}n_j/I_z$$

Wheelslips 50 in $\lambda^-$ are negative by the definition of wheelslip. However, these wheelslips 50 will be multiplied by −1 so that they can be treated as positive numbers. This is necessary to keep the Linear Programs proper since the Linear Programs only operate on positive variables. In term of these definitions the true wheelslip vector is then given by Equation 49:

$$\lambda = \lambda^+ - \lambda^- \quad (49)$$

The resulting dynamic equations have the form shown in Equation 50:

$$\dot{u} = f + U^+ \lambda^+ - U^- \lambda^-$$

$$\dot{x} = Ax + Bd + D^+ \lambda^+ - D^- \lambda^- + \gamma \quad (50)$$

The optimization problem also needs to be changed to accommodate the segregation of wheelslips 50. The minimization problem becomes Equation 51:

$$\text{minimize } E^+ \lambda^+ - E^- \lambda^- \quad (51)$$

subject to the constraints of Equation 52:
The maximization problem becomes Equation 53:

$$\text{maximize } E^+ \lambda^+ - E^- \lambda^- \quad (53)$$

$$k^T (D^+ \lambda^+ - D^- \lambda^-) \leq \hat{b}$$

$$0 \leq \lambda^+ \leq \lambda^{*+}$$

$$0 \leq \lambda^- \leq \lambda^{*-} \quad (52)$$

subject to the same constraints of Equation 52.

In the form of Equations 51 and 53, these optimization problems are no longer Linear Programs because an added restriction is applied. This restriction is that corresponding elements of $\lambda^+$ and $\lambda^-$ cannot be greater than 0 at the same time.

Also, the meaning of $\lambda^{*-}$ in Equation 52 needs to be considered. In the case of pure braking, $\lambda^*$ is considered to be the wheelslip level at which the braking forces peak. Proper brakes always have the capability to slow the wheels enough to reach the peak wheelslip threshold vector 74 $\lambda^*$. However, in the case of engine driven acceleration, the engine often cannot drive wheels 24 hard enough to reach an equivalent peak wheelslip. Therefore, the values in $\lambda^{*-}$ must be set to what is achievable. Also, the engine cannot respond as quickly as brakes 44 and the resulting lag time must be considered.

One good way to get around problems involving the specification of $\lambda^{*-}$ is to assume that the drive train operates independent of brakes 44 and is under the control of driver 22 or some other controller. Then the drive torque wheelslips, $\lambda^-$, can be treated as known quantities. To follow this approach, the decision variables for minimization and maximization need to be segregated into two groups, the wheelslips that act to reduce $\lambda^-$ and the wheelslips in the group previously defined as $\lambda^+$. Wheelslips 50 in the first group relate to situations where brake 44 is applied to a driven wheel 24, these wheelslips 50 will be denoted as $\lambda^r$.

The minimization now becomes Equation 54:

$$\text{minimize } E^+ \lambda^+ - E^- \lambda^r \quad (54)$$

subject to the constraints of Equation 55:

$$k^T (D^+ \lambda^+ - D^- \lambda^- + D^- \lambda^r) \leq \hat{b}$$

$$0 \leq \lambda^+ \leq \lambda^{*+}$$

$$0 \leq \lambda^r \leq \lambda^{*-} \quad (55)$$

and the maximization becomes Equation 56:

$$\text{maximize } E^+ \lambda^+ - E^- \lambda^r \quad (56)$$

subject of the constraints of Equation 55.

The $\lambda^{*-}$ in the stability constraints of Equation 55 are known constants. The optimization problems of Equations 54 through 56 are not proper Linear Programs because of the added restriction that the same element of $\lambda^r$ and $\lambda^+$ cannot be greater than zero at the same time. There may also be constraints between wheelslips 50 due to coupling through differentials or other means. If the constraints are algebraic and linear, they can be handled by eliminating one wheelslip variable through each independent constraint or by simply adding the constraint to the optimization problem. Rules can also be formulated for solving these optimization problems.

There is a very important point to be made. The solution of the optimization problems expressed in Equations 51 through 56, however they are found, can still be interpolated to find the final solution. The resulting solution will still be optimal when the requested acceleration from driver 22 falls outside the range of those accelerations vehicle 20 can provide while maintaining stability. The resulting solution will still provide the requested acceleration when it is in the range of those accelerations that vehicle 20 can provide while maintaining stability.

Figure 10:
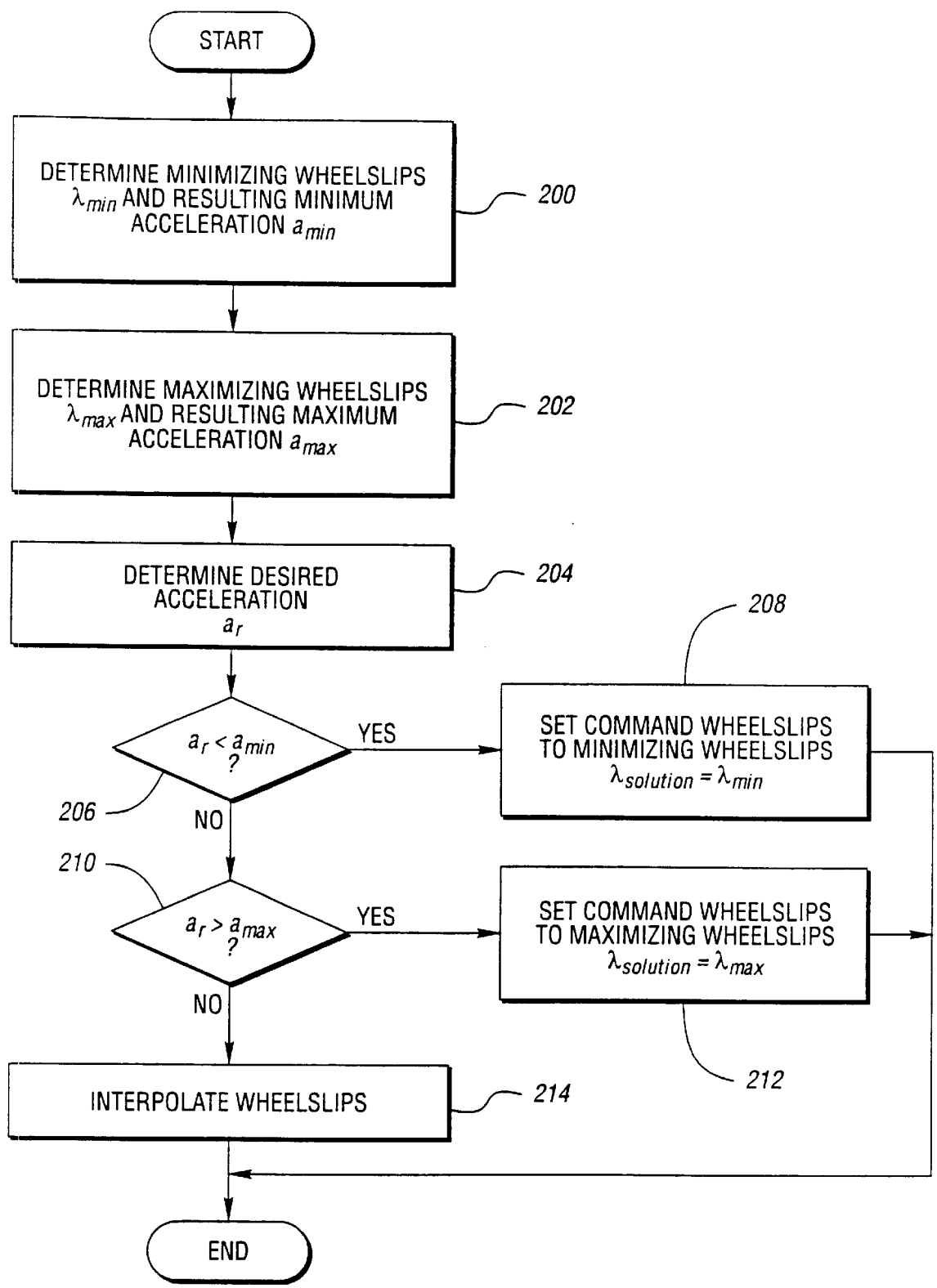
FIG. 10 is a flow diagram of an illustrative method for practicing the present invention.
Figure 11:
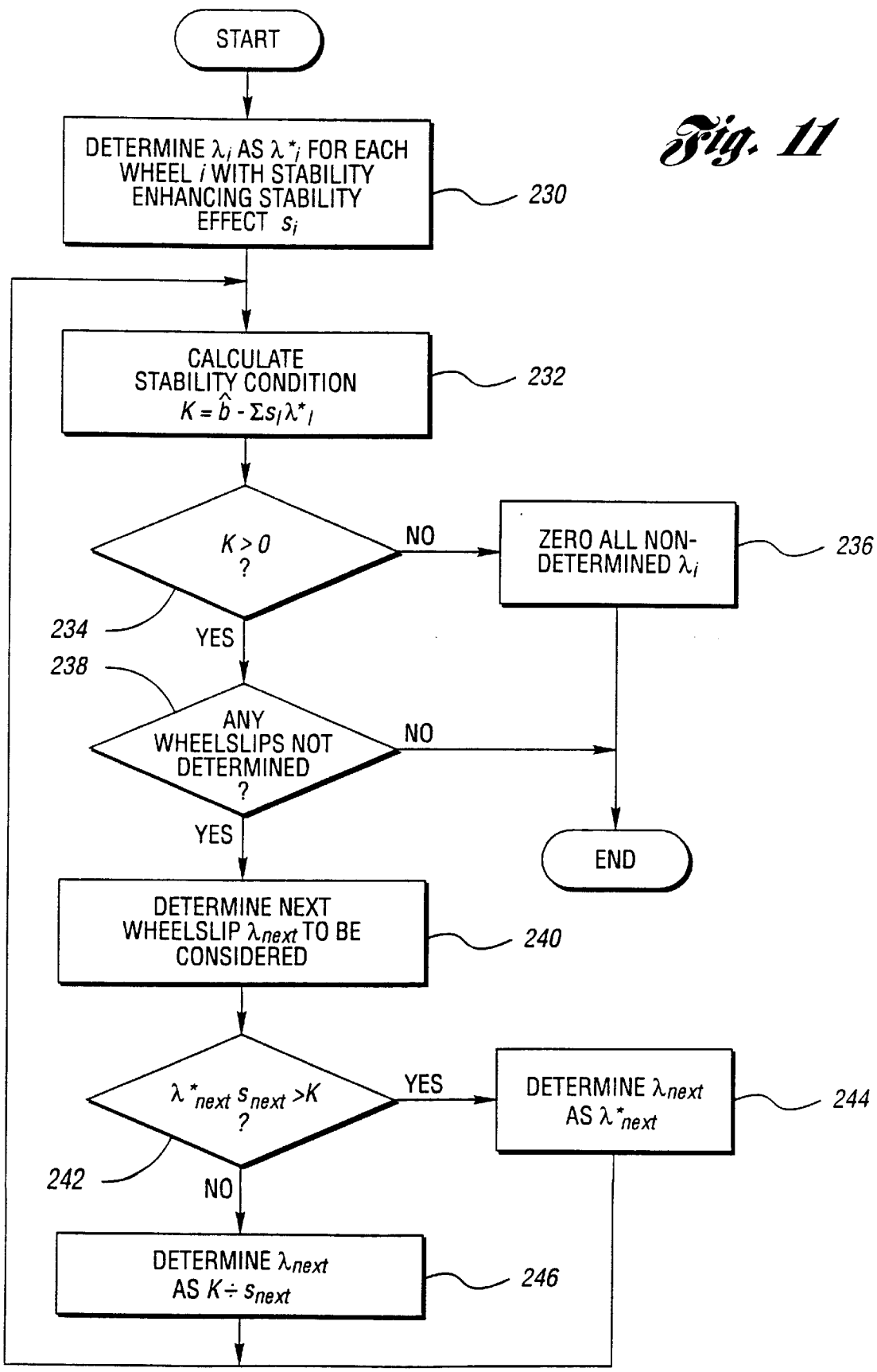
FIG. 11 is a flow diagram of a method for determining wheelslips that minimize the time rate of change of a weighted vehicle kinetic energy.
Figure 12:
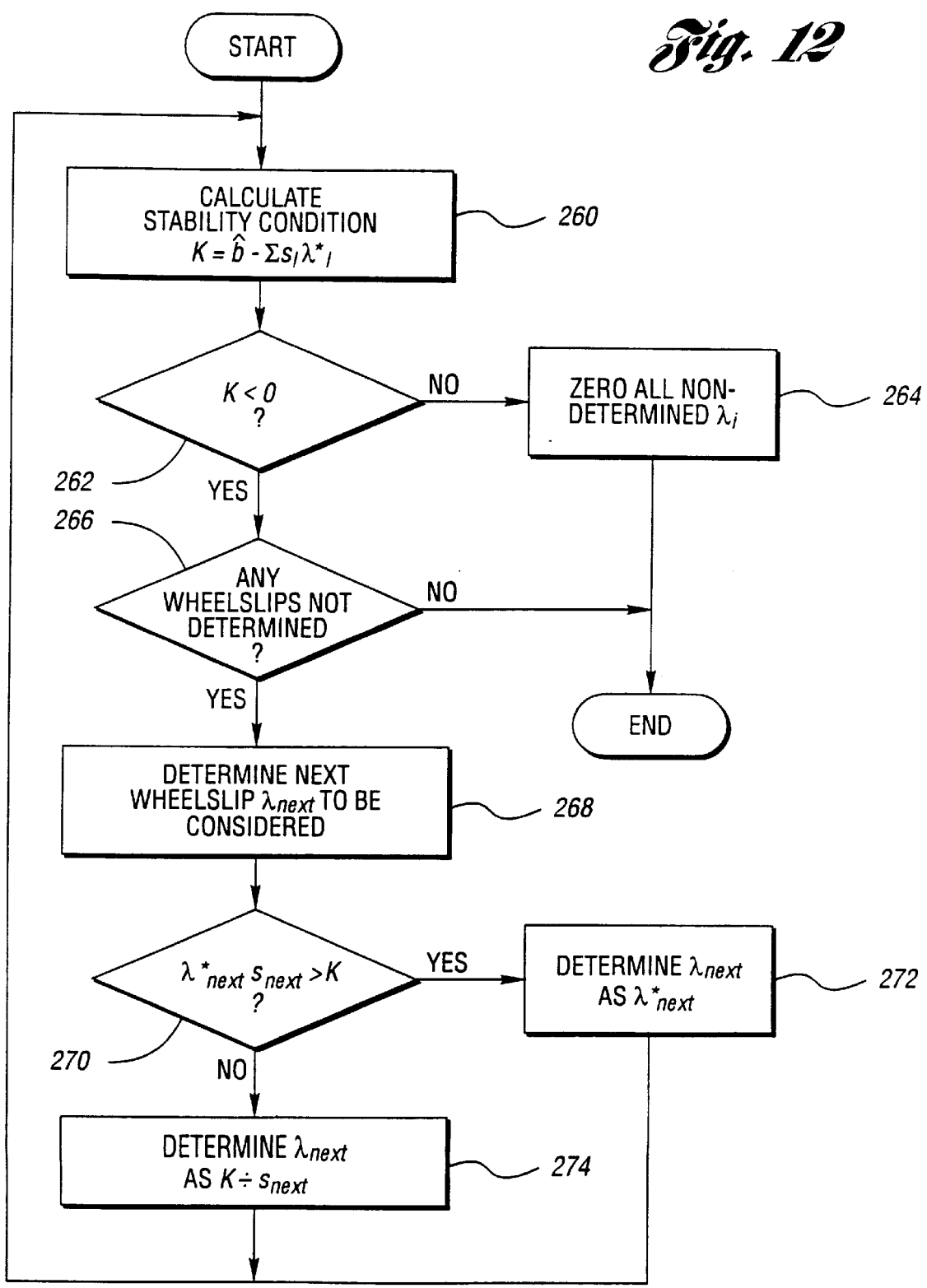
FIG. 12 is a flow diagram of a method for determining wheelslips that maximize the time rate of change of a weighted vehicle kinetic energy.

Referring now to FIGS. 10 through 12, flow diagrams are shown. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart forms for ease of illustration.

Referring now to FIG. 10, a flow diagram of an illustrative method for practicing the present invention is shown.

Wheelslips that minimize the time rate of change of weighted vehicle kinetic energy subject to traction and stability constraints, $\lambda_{min}$, and the corresponding minimum acceleration, $a_{min}$, are determined in block 200. A method for obtaining minimizing wheelslips 160 is described with regards to FIG. 11 below.

Wheelslips that maximize the time rate of change of weighted vehicle kinetic energy subject to traction and stability constraints, $\lambda_{max}$, and the corresponding maximum acceleration 170, $a_{max}$, are determined in block 202. A method for obtaining maximizing wheelslips 162 is described with regards to FIG. 12 below.

Desired acceleration is determined in block 204. In a preferred embodiment, desired acceleration 166, $a_r$, is determined from pedal commands 36 generated by driver 22 through pedal interpreter 164.

The wheelslip solution vector, $\lambda_{solution}$, is determined based on comparisons of desired acceleration 166 with minimum acceleration 168 and with maximum acceleration 170 as shown in blocks 206 and 210 respectively.

If desired acceleration 166 is less than minimum acceleration 168, the solution or command vector for wheelslips 50 is set to minimizing wheelslips 160, $\lambda_{min}$, the solution to the minimization problem as shown in block 208.

If desired acceleration 166 is greater than maximum acceleration 170, the solution or command vector for wheelslips 50 is set to maximizing wheelslips 162, $\lambda_{max}$, the solution to the maximization problem as shown in block 212.

If desired acceleration 166 is between minimum acceleration 168 and maximum acceleration 170, the solution vector for wheelslips 50 is interpolated between minimizing wheelslips 160 and maximizing wheelslips 162 based on desired acceleration 166. In a preferred embodiment, a linear interpolation method, such as described with regards to FIG. 9 above, is used.

Referring now to FIG. 11, a flow diagram of a method for determining wheelslips that minimize the time rate of change of weighted vehicle kinetic energy is shown.

For each wheel with a stability enhancing stability effect, the wheelslip is determined as the wheelslip threshold in block 230. Each wheel i 24 has a corresponding stability effect $s_i$, which indicates the effect on the stability of vehicle 20 of applying corresponding wheelslip 50, $\lambda_i$. A negative stability effect, $s_i$, indicates stability enhancement. Therefore, setting wheelslip 50 $\lambda_i$ to the corresponding wheelslip threshold 74, $\lambda^*$, results in the maximum stability enhancement from wheel i 24.

The stability condition is calculated in block 232. Stability condition K represents the excess stability available to bring on wheels 24 with stability diminishing stability effect. The stability condition is found by Equation 35.

The value of stability condition K is compared to zero in block 234. If the stability condition is less than or equal to zero, no surplus stability exists, and all non-determined wheelslips 50 are set to zero in block 236.

A check is made to see if any wheelslips have not been determined in block 238. If all wheelslips have been determined, the method is completed.

The next wheelslip to be considered is determined in block 240. For each undetermined wheelslip 50, the ratio of the acceleration effect, $e_i$, to the stability effect, $s_i$, is calculated. Wheelslip 50 having the most negative ratio is selected as the next wheelslip, $\lambda_{next}$, to be considered.

The stability condition is compared to the effect of applying wheelslip threshold 74 to wheel 24 corresponding the next wheelslip to be considered in block 242. If sufficient excess stability exists to compensate for the instability caused by using wheelslip threshold 74 for wheelslip 50, the next wheelslip 50 is set to the corresponding wheelslip threshold 74 as in block 244. If not, the next wheelslip is determined from the remaining surplus stability as expressed in Equation 36 as in block 246.

The stability condition is again calculated, and another wheelslip 50 is chosen to be considered as long as excess stability exists and at least one wheelslip 50 remains to be determined.

Referring now to FIG. 12, a flow diagram of a method for determining wheelslips that maximize the time rate of change of a weighted vehicle kinetic energy is shown.

The stability condition is calculated in block 260. Stability condition K, when it is negative, represents the stability deficit that must be overcome by bringing on wheels 24 with stability enhancing stability effects. The stability condition is found by Equation 35.

The stability condition is compared to zero in block 262. If stability condition K is greater than or equal to zero, no stability deficit exists, and all non-determined wheelslips 50 are set to zero in block 264. If the stability condition is less than zero, wheel 24 with undetermined wheelslip 50 and stability enhancing stability effect will be brought on.

A check is made to see if any wheelslips have not been determined in block 266. If all wheelslips having stability enhancing stability effect have been determined, the method is completed.

The next wheelslip to be considered is determined in block 268. For each undetermined wheelslip 50 having a stability enhancing stability effect, the ratio of the acceleration effect, $e_i$, to the stability effect, $s_i$, is calculated. Wheelslip 50 having the smallest ratio is selected as the next wheelslip, $\lambda_{next}$, to be considered.

The stability condition is compared to the effect of applying wheelslip threshold 74 corresponding to the next wheelslip to be considered in block 270. If the product of the stability effect and wheelslip threshold 74 is greater than (less negative than) stability condition K, the next wheelslip 50 to be considered is set to wheelslip threshold 74. Otherwise, the next wheelslip 50 to be considered is set to the ratio of the stability condition to the stability effect for wheel 24 corresponding to the next wheelslip 50 to be considered.

The stability condition is again calculated, and another wheelslip 50 is chosen to be considered as long as a stability deficit exists and at least one wheelslip 50 with stability enhancing stability effect remains to be determined.

Figure 13:
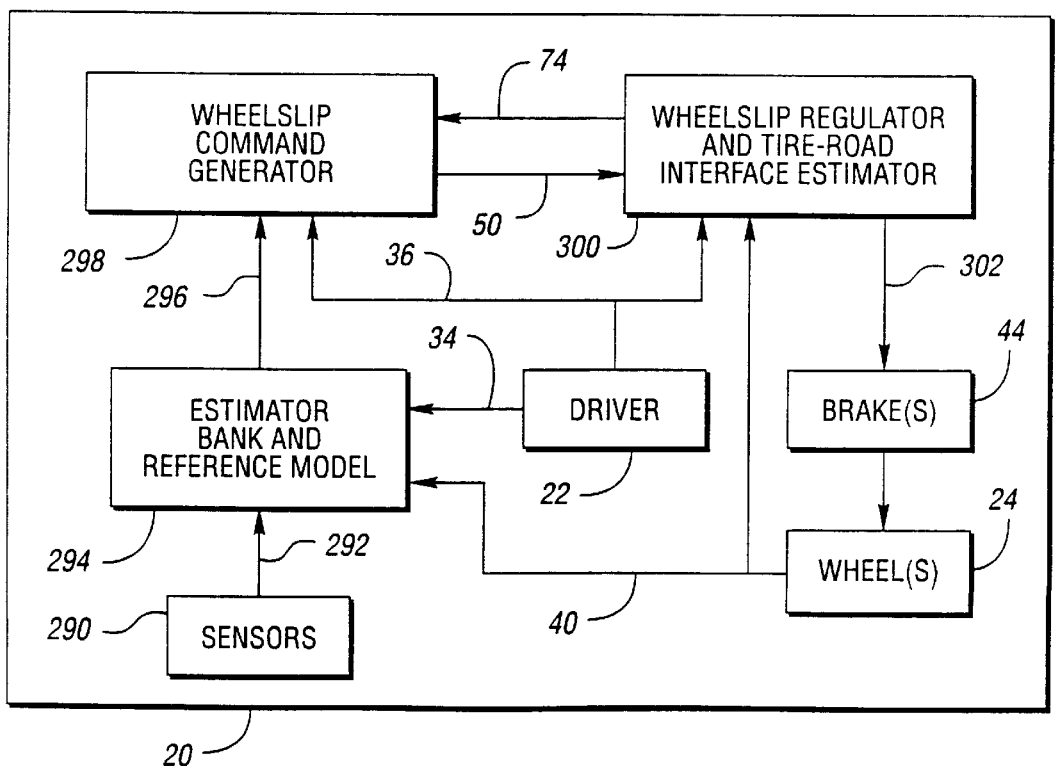
FIG. 13 is a block diagram of an exemplary system according to the present invention.

Referring now to FIG. 13, a block diagram of an exemplary system according to the present invention is shown. Driver 22 develops steering input and pedal commands 36. Driver 22 is shown in vehicle 20. However driver 22 may remotely pilot vehicle 20. Driver 22 may be human or may be a controller such as may be implemented with a digital computer.

Vehicle 20 includes at least one wheel 24 for which wheelslip 50 is to be controlled. Each wheel 24 has one or more brake 44 used to slow rotational wheel rate 40.

At least one, preferably two, sensors 290 produce output signals 292 from which vehicle rates such as longitudinal velocity 26, latitudinal velocity 28, and yaw rate 30 may be determined. In a preferred embodiment, two accelerometers are used for sensor 290.

Estimator bank and reference model 294 accepts steering input 34 from driver 22, rotational wheel rates 40 from wheels 24, and sensor signals 292 from sensors 290. Using these values, estimator bank and reference model 294 determines or estimates variables such as longitudinal velocity 26, lateral velocity 28, yaw rate 30, trajectory error 100, and, for each wheel 24, normal force 46, steering angle 32, and slip angle 84. These variables, shown as signals 96, are used by wheelslip command generator 298. Longitudinal velocity 26 is estimated from wheel speeds 40 longitudinal acceleration and lateral acceleration. Yaw rate 30 is obtained from a yaw rate sensor. Slip angle 84 is determined using estimates of wheelslip 50, normal loads 46 and lateral acceleration. Lateral velocity 28 is derived algebraically from the estimates of slip angles 84 using Equation 2. Trajectory errors 100 are described with regards to FIG. 6 above. Steering angles 32 are measured. Normal forces 46 are estimated using lateral longtudinal acceleration, as inputs to a filtered quasistatic model produced from vehicle moment balance equations about the roll and pitch axes.

Wheelslip regulator and tire-road interface estimator 300 accepts pedal commands 36 from driver 22, rotational wheel rates 40 from wheels 24, and determined wheelslips 50 from wheelslip command generator 298. Wheelslip regulator 300 determines wheelslip thresholds 74 and brake commands 302. Brake commands 302 control each brake 44.

Wheelslip command generator 298 uses signals 296, pedal commands 36 from driver 22, and wheelslip thresholds 74 to calculate wheelslips 50 for each controlled wheel 24 as described with regards to FIGS. 4 through 12 above.

While the best modes for carrying out the invention have been described in detail, those familiar with the art to which this invention relates will recognize various alternative designs and embodiments for practicing the invention as defined by the following claims.

What is claimed is:

1. A method for determining a wheelslip vector used to control braking in an automotive vehicle having at least one wheel for which braking control is desired, the method comprising the steps of:

determining a stability effect for each of the at least one wheel; and for each of the at least one wheel with a stability enhancing stability effect, determining as the corresponding value of the wheelslip vector a wheelslip threshold such that said wheelslip vector provides optimal acceleration.

2. The method for determining a wheelslip vector according to claim 1, further comprising the steps of:

determining a stability condition resulting from each of the determined wheelslips; and if the stability condition is less than or equal to zero, determining as zero each of the corresponding values of the wheelslip vector not yet determined.

3. The method for determining a wheelslip vector according to claim 1 further comprising the steps of:

determining a stability condition resulting from each of the determined wheelslips;

if the stability condition is less than or equal to zero, determining as zero each of the corresponding values of the wheelslip vector not yet determined;

if the stability condition is greater than zero, determining the next wheelslip to be considered from all wheelslips not yet determined;

if the product of the wheelslip threshold for the wheel corresponding to the next wheelslip and the stability effect for the wheel corresponding to the next wheelslip is less than the stability condition, determining as the corresponding value of the wheelslip vector the wheelslip threshold for the wheel corresponding to the next wheelslip, else determining as the corresponding value of the wheelslip vector the ratio of the stability condition to the stability effect for the wheel corresponding to the next wheelslip; and repeating determining the stability condition, determining-as zero all wheelslips remaining if the stability condition is less than or equal to zero, determining the next wheelslip to be considered, and determining the next wheelslip, if any wheelslips remain not determined.

4. The method for determining a wheelslip vector according to claim 1, further comprising the steps of:

determining an acceleration effect for each undetermined wheelslip; and determining the corresponding values of the wheelslip vector not yet determined based on a corresponding ratio of acceleration effect to stability effect.

5. The method for determining a wheelslip vector according to claim 2 wherein the stability condition is determined from a decomposed stability constraint based on a positive definite Lyapunov function.

6. The method for determining a wheelslip vector according to claim 5 wherein the stability condition is determined from a decomposed stability constraint based on a positive definite Lyapunov function.

7. The method for determining a wheelslip vector according to claim 2 wherein the decomposed stability constraint is based on regulating a yaw rate error.

8. The method for determining a wheelslip vector according to claim 1 wherein the decomposed stability constraint is based on regulating a yaw rate error.

9. The method for determining a wheelslip vector according to claim 1 whereby the stability effect and the acceleration effect enable a determination of the wheelslip vector containing wheelslip values that minimize a time rate of change of vehicle kinetic energy while maintaining vehicle stability and controllability.

10. A method for determining a wheelslip vector used to control braking in an automotive vehicle having at least one wheel for which braking control is desired, the method comprising the steps of:

determining a stability effect for each of the at least one wheel;

determining a stability condition; determining as zero each of the values of the wheelslip vector corresponding to each of the at least one wheel having a stability diminishing stability effect;

if the stability condition is greater than or equal to zero, determining as zero each of the corresponding values of the wheelslip vector not yet determined;

if the stability condition is less than zero, determining the next wheelslip to be considered from all wheelslips not yet determined;

if the product of the wheelslip threshold for the wheel corresponding to the next wheelslip and the stability effect for the wheel corresponding to the next wheelslip is less negative than the stability condition, determining as the corresponding value of the wheelslip vector the wheelslip threshold for the wheel corresponding to the next wheelslip, else determining as the corresponding value of the wheelslip vector the ratio of the stability condition to the stability effect for the wheel corresponding to the next wheelslip; and repeating determining the stability condition, determining as zero all wheelslips remaining if the stability condition is greater than or equal to zero, determining the next wheelslip to be considered, and determining the next wheelslip, if any wheelslips remain not determined such that said wheelslip vector provides optimal acceleration.

11. The method for determining a wheelslip vector according to claim 10, further comprising the steps of:

determining an acceleration effect for each undetermined wheelslip; and if the stability condition is less than zero, determining the next wheelslip to be considered from all wheelslips not yet determined based on a corresponding ratio of acceleration effect to stability effect.

12. The method for determining a wheelslip vector according to claim 10 wherein the stability condition is determined from a decomposed stability constraint based on a positive definite Lyapunov function.

13. The method for determining a wheelslip vector according to claim 10 wherein the decomposed stability constraint is based on regulating a yaw rate error.

14. The method for determining a wheelslip vector according to claim 11 whereby the stability effect and the acceleration effect enable a determination of the wheelslip vector containing wheelslip values that maximize a time rate of change of vehicle kinetic energy while maintaining vehicle stability and controllability.

15. A method for determining a wheelslip vector used to control braking in an automotive vehicle having at least one wheel for which control is desired, each of the at least one wheel controlled by a corresponding element of the wheelslip vector, each of the at least one wheel having a wheelslip threshold representing the maximum allowed wheelslip value, the method comprising:

determining a stability effect for each of the at least one wheel;

determining an acceleration effect for each of the at least one wheel;

establishing a decomposed stability constraint;

determining a first group of wheelslips and a second group of wheelslips, the first group comprising each wheelslip corresponding to a wheel having a stability enhancing stability effect, the second group comprising each wheelslip corresponding to a wheel having a stability diminishing stability effect;

ordering the wheelslips of the first group based on a ratio of acceleration effect to the stability effect for each of the corresponding at least one wheel;

ordering the wheelslips of the second group based on a ratio of acceleration effect to the stability effect for each of the corresponding at least one wheel; and determining a wheelslip value for each wheel based on at least one of a set comprising
 (a) to which particular group the wheelslip corresponding to the wheel is a member and
 (b) the ordering of wheelslips in the particular group;

wherein the wheelslip vector is comprised of the wheelslip value for each wheel.

* * * * *